United States Patent [19]
Adelman et al.

[11] 4,086,384
[45] Apr. 25, 1978

[54] REFORCED PAPER-MICROFOAM SHEET PACKAGING MATERIAL

[75] Inventors: Herbert B. Adelman, Wilmington, Del.; Jack Goodman, Springfield, Pa.

[73] Assignee: The Crowell Corporation, Newport, Del.

[21] Appl. No.: 704,980

[22] Filed: Jul. 13, 1976

[51] Int. Cl.² ............................................. B32B 7/02
[52] U.S. Cl. .................... 428/213; 428/193; 428/238; 428/248; 428/251; 428/285; 428/293; 428/310; 428/315; 428/426; 428/428; 428/441; 428/513; 428/537
[58] Field of Search ............... 428/213, 193, 238, 248, 428/251, 285, 293, 310, 315, 426, 428, 441, 513, 537; 92/3, 61 R, 62; 206/245, 326, 521, 523; 229/3.5 R, 14 C, 14 BL, 53, 55, 48 T, 87 R, 88, 91

[56] References Cited

U.S. PATENT DOCUMENTS

| | | | |
|---|---|---|---|
| 1,460,392 | 7/1923 | Schenkelberger | 229/14 C |
| 2,653,090 | 9/1953 | Crandall | 428/293 |
| 2,699,389 | 1/1955 | Crandall | 92/3 |
| 3,288,353 | 11/1966 | McCullough | 229/87 |
| 3,523,055 | 4/1970 | Lemelson | 206/46 FN |
| 3,669,252 | 6/1972 | Evans | 206/46 FN |
| 3,768,724 | 10/1973 | Hill | 229/53 |
| 3,867,874 | 2/1975 | O'Neil | 93/61 R |
| 3,948,436 | 4/1976 | Bambara | 229/55 |

*Primary Examiner*—Marion E. McCamish
*Attorney, Agent, or Firm*—Connolly and Hutz

[57] ABSTRACT

A padded wrapping and packaging material is comprised of laminated layers of kraft paper and a sheet of closed cellular microfoam, either reinforced by an intermediate fiberglass insert or with the face of the microfoam coated with a cohesive material, or both features may be utilized with the laminate.

5 Claims, 4 Drawing Figures

REFORCED PAPER-MICROFOAM SHEET PACKAGING MATERIAL

BACKGROUND OF THE INVENTION

Various padding materials have been applied to paper for wrapping and packaging. Such materials have not, however, been as strong, light and as convenient to secure in place as might be desired. An object of this invention is to provide a highly efficient padded wrapping and packaging material, which is extremely strong and easy to apply and to secure in place.

SUMMARY

In accordance with this invention, a layer of fiberglass is interposed between adhered layers of a microfoam and paper laminate. The fiberglass makes the ultimate sheet remarkably strong without significantly increasing its weight. This provides a high degree of protection for objects packaged within the laminate at a relatively low weight, which can be economically mailed or otherwise transported. Instead of or in addition to the fiberglass insert, a cohesive coating may be applied to the exposed face of the microfoam to facilitate sealing the laminate about an object.

BRIEF DESCRIPTION OF THE DRAWINGS

Novel features and advantages of the present invention will become apparent to one skilled in the art from a reading of the following description in conjunction with the accompanying drawings wherein similar reference characters refer to similar parts and in which.

DESCRIPTION OF THE PREFERRED EMBODIMENTS

Figure 1:
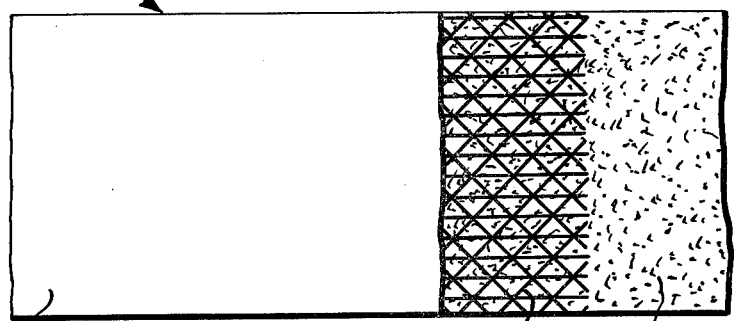
FIG. 1 is a top plan view of a fiberglass-reinforced embodiment of this invention with its layers partially removed.

In FIG. 1 is shown a sheet of packaging or wrapping material 10, which includes three layers. The upper outer layer 10 is a sheet of kraft paper which is, for example, thirty, sixty or ninety pound kraft paper or a forty-two pound liner board. The bottom layer 14 is a microfoam having a sealed structure, which is, for example 1/16, 3/32, ⅛ or ¼ inch thick. A highly effective microfoam is, for example, DuPont microfoam manufactured by E.I. DuPont de Nemours of Wilmington, Delaware from polypropelene resin, which constitutes a high-bulk material with approximately 50,000 closed air cushion cells per cubic inch. Such a laminate is exceptionally effective in protecting fragile products, and is resilient over a wide temperature and humidity range. A highly effective combination for versatile service includes, for example, one-sixteenth inch thick microfoam on thirty pound kraft paper.

A layer of fiberglass strands 16 arranged, for example, in a diamond pattern is interposed between paper layer 12 and microfoam layer 14 and sealed overall between them by an adhesive 17, which is for example of the hot melt type, such as amorphous polypropylene. The ultimately laminated sheet 12 has remarkable strength to weight ratio and is extremely useful for wrapping and packaging where substantial tear strength is required. It is very flexible which permits it to conform to different shaped objects, is resistant to impact, corrosion, tarnish, moisture and heat. It is also lint free, odorless and non-slipping. This makes it extremely useful for protective wraps, padded pouches, furniture wraps, blankets and thermal installations.

The microfoam layer 14 remarkably covers, imbeds and shields fiberglass insert 16 to the extent that the laminate is unexpectedly useful for wrapping and packaging articles having a very smooth and fine finish which is subject to abrasion damage. Ordinary fiberglass-reinforced paper having fiberglass strands sandwiched between two sheets of paper would be much more abrasive than the laminate of this invention as well as being much heavier and stiffer. A paper with exposed fiberglass adhered to one side would also be unsuitable for protecting smoothly finished articles. In addition to the difficulty in retaining the fiberglass on the paper, the fiberglass also has the ability to limit punctures or tears as well as providing high tear strength on an overall basis. This greatly limits the extent of any punctures or tears and the extent to which any objects wrapped in the fiberglass-reinforced laminate are exposed to abrasion and other damage. The hot melt adhesive used to adhere the layer together also adds unexpected waterproofing characteristics to the laminate. Although the sealed cell foam is inherently waterproof, it is susceptible to punctures and tears, which are likely to be sealed by the hot melt adhesive layer between the microfoam and paper.

Figure 2:
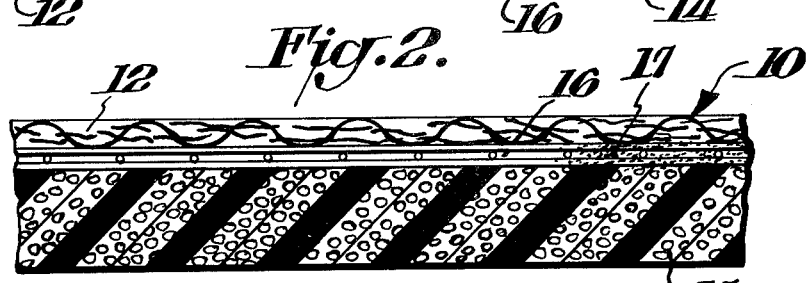
FIG. 2 is a cross-sectional view taken through the length of the embodiment shown in FIG. 1.
Figure 4:
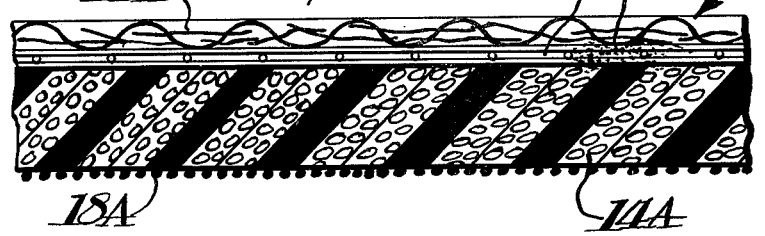
FIG. 4 is a cross-sectional view in elevation of still another embodiment of this invention.

In FIG. 4 is shown a laminated material 10A which is similar to that shown in FIGS. 1 and 2 except that a layer 18A of cohesive material is applied to the outer surface of microfoam layer 14A. Cohesive layer 18A is, for example, a latex material. It has the property of sticking to itself, but not adhering to other materials. The cohesive coated material coheres very readily to itself to highly facilitate securing sheet 10A about an object wrapped within it. Although it is nonadherent to other objects than itself, it does have remarkably high frictional resistance and is somewhat rubbery to touch. It, therefore, does not slide off an object and is easy to wrap and stays in place advantageously as well as facilitating ultimate sealing to itself.

Cohesive layer 18A also has the unexpected capability of making a laminate including it, self-repairable. If, for example, laminate 10A should rip or tear during wrapping or prior thereto, the fiberglass limits the area of damage, and the severed cohesively coated material can be squeezed together to repair the rip or puncture. This is a highly advantageous unique feature provided by the smooth flexible microfoam in conjunction with the cohesive coating.

Figure 3:
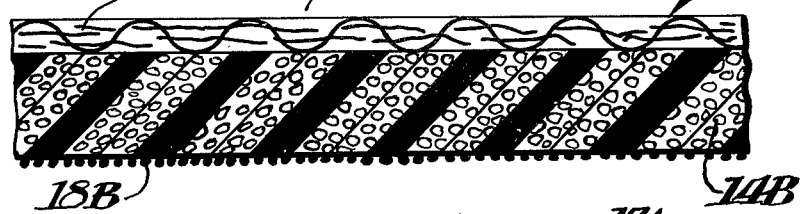
FIG. 3 is a cross-sectional view similar to FIG. 2 of another embodiment of this invention.

In FIG. 3 is shown a laminated material 10B, which is similar to 10A shown in FIG. 4 except that it omits the fiberglass layer 16A. It has all of the properties referred to relative to laminate 10A of FIG. 4 except the tear strength and tear-stopping features provided by fiberglass layer 16A.

We claim:

1. A laminated sheet material comprising a relatively thin layer of paper material, a relatively thicker layer of a sealed cell microfoam polymer, a layer of strong adhesive material completely bonding the microfoam and paper layers together, and a layer of fiberglass strands inserted between the paper and microfoam layers and imbedded in the adhesive whereby an extremely strong tear-resistant and tear-stopping laminate is provided having an extremely smooth and protective microfoam surface which is capable of protecting extremely fine finishes.

2. A laminated sheet material as set forth in claim 1 wherein the adhesive is waterproof whereby the waterproofing characteristics of the microfoam are reinforced.

3. A laminated sheet material as set forth in claim 2 wherein the waterproof adhesive is a hot melt adhesive.

4. A laminated sheet material as set forth in claim 1 wherein a cohesive nonadhesive coating is applied to the exposed surface of the microfoam whereby a uniquely high coefficient of friction is imparted to the exposed surface, and securing of the laminate to itself is facilitated.

5. A laminated sheet material comprising a relatively thin layer of paper material, a relatively thicker layer of sealed cell microfoam polymer, a layer of strong adhesive material completely bonding the microfoam and paper layer together, and a cohesive nonadhesive coating is applied to the exposed surface of the microfoam whereby a uniquely high coefficient of friction is imparted to the exposed surface and securing of the laminate to itself is facilitated.

* * * * *

UNITED STATES PATENT AND TRADEMARK OFFICE
CERTIFICATE OF CORRECTION

PATENT NO.   :   4,086,384
DATED        :   April 25, 1978
INVENTOR(S)  :   Herbert B. Adelman and Jack Goodman It is certified that error appears in the above-identified patent and that said Letters Patent is hereby corrected as shown below:

The title on the face page and at the top of column 1, should read:   -- SHEET PACKAGING MATERIAL --.

In column 1, line numbered 54, "polypropelene" should be -- polypropylene --.

In column 2, line 26, "layer" should be -- layers --.

In column 4, line 8, "layer" should be -- layers --.

Signed and Sealed this

Twenty-first Day of November, 1989

Attest:

JEFFREY M. SAMUELS

Attesting Officer    Acting Commissioner of Patents and Trademarks